Nov. 22, 1955 L. L. DAVENPORT 2,724,825
RADAR DIRECTION FINDING SYSTEM
Filed May 7, 1945 2 Sheets-Sheet 1

INVENTOR.
LEE L. DAVENPORT
BY
Ralph L Chappell
ATTORNEY

INVENTOR
LEE L. DAVENPORT

BY

ATTORNEY

United States Patent Office 2,724,825
Patented Nov. 22, 1955

2,724,825

RADAR DIRECTION FINDING SYSTEM

Lee L. Davenport, Cambridge, Mass., assignor, by mesne assignments, to the United States of America as represented by the Secretary of the Navy Application May 7, 1945, Serial No. 592,365

17 Claims. (Cl. 343—7.4)

This invention relates to a gun laying or directional finding radar system. In the particular system of this invention, two beams are used, one scanning in azimuth and the other in elevation. The frequency of each beam is varied in accordance with its scanning movement, so that the angular position of each beam corresponds to a particular radiating frequency. When these beams are directed on a target, energy will be reflected back to their source, and the frequency of this reflected energy may be utilized to give an indication of the direction of a target or to lay an antenna or gun in the direction of the target. The system operates as a pulsed radar device.

In present gun laying systems, tracking is generally done by conical-scanning or lobe-switching. One of the major difficulties of these systems is that fading will produce an error in the data presented, since the system is dependent upon the amplitude of the returned signal. In a conical scan, for example, the axis of the cone being directed toward the target will receive signals of approximately constant magnitude which will be used to drive the antenna device and keep it pointing at the target. However, should fading occur during the motion of the beam on one side of its excursion around the cone, and not on the other side, it will appear to the receiving apparatus as if the target has jumped over to a new position, introducing an angular error in the tracking function. There is no apparent way for correcting this difficulty or overcoming it with pure conical-scanning or lobe-switching systems. By having a system, such as that in the present invention, which scans with a known rate of variation in frequency, this difficulty will be overcome.

In accordance with the principles of this invention two antennas are used, whose beams are respectively horizontally and vertically polarized to reduce crosstalk. Depolarization effects will average about 5%. One beam scans in elevation and the other in azimuth, while the frequency is varied in accordance with the scanning movement. The energy reflected when each beam strikes a target is picked up by the respective antenna, and after suitable frequency conversion and amplification, is fed to a limiter and frequency discriminator, where an output voltage is obtained which varies as the frequency of this input wave. A servo-mechanism is connected to control each antenna in accordance with the frequency of the reflected energy received, and thus keep the axis of directivity of each antenna trained on the target. To overcome the effect of a shift in frequency due to motion of the target, that is, the so-called Doppler Effect, suitable compensating means may be added, which corrects the frequency of the wave at some point in its path through the system, if such a correction is necessary.

It is an object of this invention to provide a means for training an antenna, gun, or other device likely to be directed on a target or other distant object.

It is a further object of this invention to provide a means for determining the direction of a target or other distant object in either elevation, azimuth, or both.

It is a further object of this invention to provide a means for training an antenna, gun, or other device likely to be directed on a target or other distant object, or for determining the direction of a target or other distant object without the introduction of the usual error caused by fading.

It is a further object of this invention to provide a means to compensate for the so-called Doppler effect in a device which operates in accordance with the frequency of received signals.

It is a further object of this invention to provide a means for directing a device on or determining the direction of an object by varying the frequency of the radiated beams in accordance with their direction and utilizing this frequency for continuously directing any suitable device on the object or for giving an indication of the direction of the object.

Other objects and features of the present invention will become apparent on a careful consideration of the following detailed description of a typical embodiment when taken together with the accompanying drawing, in which.

Figure 1:
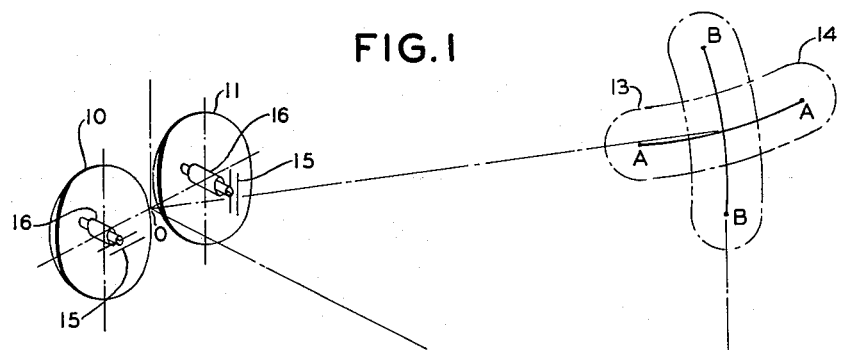
Fig. 1 is a generally perspective view of the antennas accompanied by a cross section of their field patterns over the range of beam oscillation.

Fig. 1 illustrates the type of scanning to be incorporated. Antenna 10 produces a horizontally polarized beam, whose axis oscillates over the arc AA. Likewise, antenna 11 produces a vertically polarized beam, whose axis oscillates over the arc BB. The outline of a section of the radiation patterns taken over their scanning range is indicated by lines 13 and 14, respectively. The antennas themselves may or may not be moved physically to secure the desired scanning. A number of antennas known to the science at the present time will automatically radiate at different angles when the frequency of excitation varies. The linear array and the conventional dipole with external choke, for example, display this characteristic. In the illustrated embodiment, dipole antennas with conventional parabolic reflectors behind the dipoles, parasitic reflectors 15 in front, and quarter wave chokes or bazookas 16 have been selected. Thus by varying the frequency of the transmitted energy in a known manner, the two beams at 13 and 14 can be made to scan in azimuth and elevation, respectively. Echo signals received from a target will be of a frequency depending on the angular position of the target in azimuth and elevation with respect to point O where the antennas are located, it being ordinarily true that the target's distance from the antennas will be sufficiently great to enable both antennas to be considered as located at a common point. Both antennas are excited at the same time, but they are disposed at right angles to each other so that one will scan in elevation and the other in azimuth. Careful measurements have shown that there will be no appreciable polarization shift in the energy when reflected from the target. This means that the returned energy will be reflected without any appreciable change in the polarity, and the vertically polarized echo will not affect the circuit of antenna 10 while the horizontally polarized echo will not affect the circuit of antenna 11.

Figure 2:
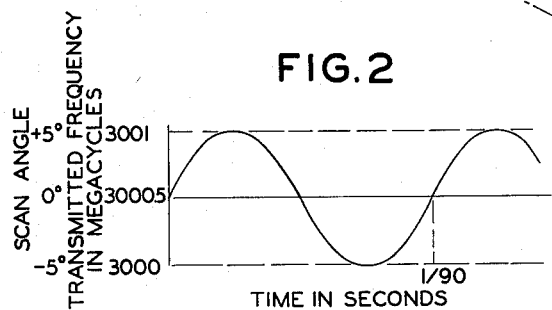
Fig. 2 is a plot showing the variation of the frequency over a ten degree range of scan with respect to time.

In Fig. 2 the frequency change of the radiation is indicated as each antenna scans through say ten degrees. The scanning rate may be ninety oscillations per second.

Figure 3:
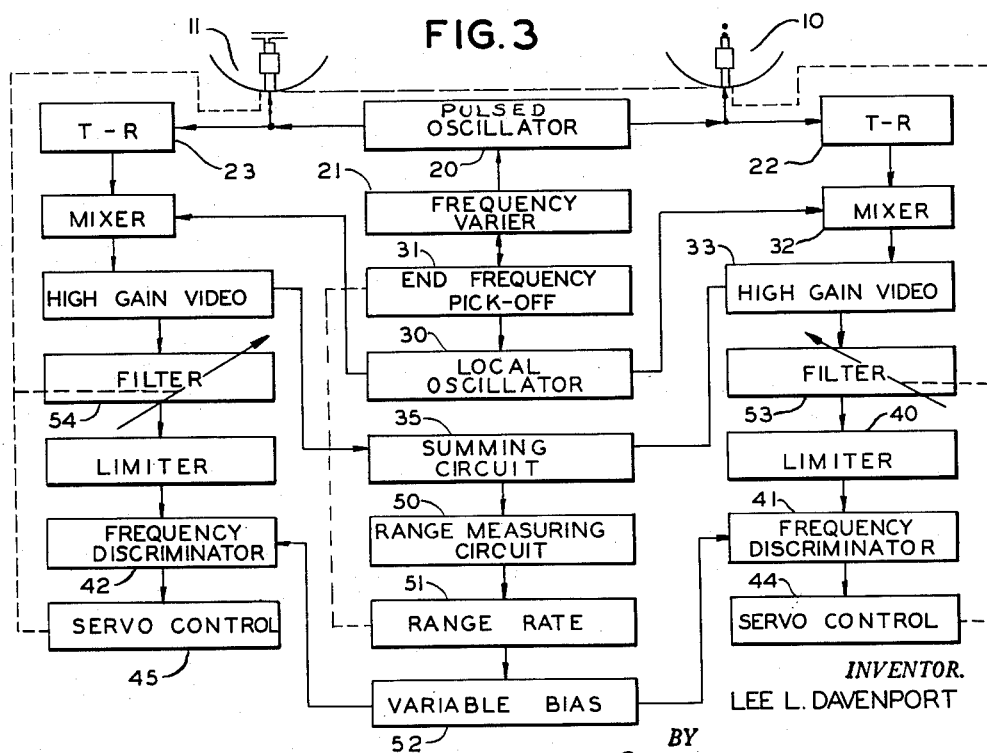
Fig. 3 is a block diagram showing the relationship of the various elements of the system.

Fig. 3 discloses a block diagram of the embodiment of the invention. The oscillator 20 produces a wave whose frequency is varied between the limit of say 3,000 and 3,001 megacycles by means of the frequency varier 21. This variation may occur at any desired rate. Here a time of one-ninetieth of a second has been chosen for the frequency to change over its range and return. The output of the oscillator is suitably pulsed by a modulating circuit, not separately shown, but considered as part of the oscillator. During the transmission pulse the receiving circuits are protected by TR boxes 22 and 23 of the conventional gas tube type. The echo signals when received by their respective azimuth and elevation antennas 10 and 11 pass through the respective TR boxes 22 and 23. Since the paths of the horizontally and vertically polarized signals from the TR boxes are similar, only one path will be described, it being understood that the apparatus along the other path operates in like manner.

Local oscillator 30 is tuned by the end frequency circuit 31 to either the upper or lower frequency limit of the transmitting oscillator as desired. This end frequency pick-off operates in response to frequency varier 21 and maintains the local oscillator frequency at the proper limit in the event that the corresponding frequency limit on the transmitting oscillator changes.

Figure 4:
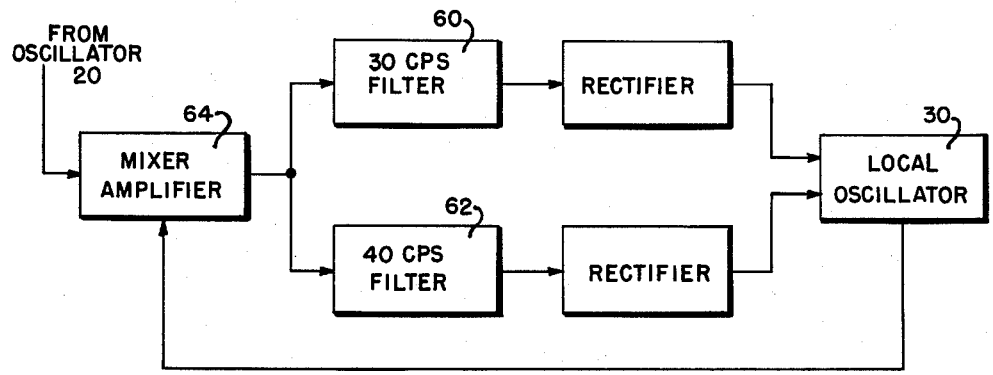
Fig. 4 is a block diagram of a portion of the circuit of Fig. 3.

A suitable circuit for the low end frequency pick-off may be a pair of tuned circuits in the low audio range, as illustrated in Fig. 4. These two resonant filters 60 and 62 tuned to say 30 cycles per second and 40 cycles per second may be fed from a mixer and amplifier 64 which combines the local oscillator frequency with a small part of the transmitter frequency. The output of the 40 cycles filter may be rectified and made to cause the frequency of the local oscillator 30 to increase. In a similar way, the output of the 30 cycle filter would cause the local oscillator frequency to decrease. A long time constant circuit (long compared with the scan frequency assumed to be 90 cycles per second) would limit the response time of the local oscillator to the action of these filters.

The circuit would then operate as follows: if the transmitter frequency at the low frequency end of the scan cycle did not come to a value within 40 cycles of the local oscillator frequency, the local oscillator frequency would have to be tuned until the 40 cycle filter resonated. The voltage output of this filter then could cause the local oscillator frequency to increase until the 30 cycle filter began to resonate. At some point, the voltage outputs of the two filters will cancel in such a way as to keep the local oscillator frequency about 31 cycles lower than the end transmitted frequency. The local oscillator frequency is prevented from following the transmitter frequency during the scan cycle by the long time constant circuit.

It is to be understood, however, that the local oscillator may be tuned to the desired frequency limit and its frequency maintained there by manual adjustment. The output of the local oscillator is mixed with the received signal to produce a difference frequency in the video range. After amplification in high gain circuit 33, this video frequency is fed to two sources. The first is summing circuit 35, which may be a second detector and which is used to give a pulse for range determination when fed into the range measuring circuit. The second is the limiting and frequency discriminator circuits 40 and 41, respectively through suitable filters to be more fully described. These limiting and discriminator circuits provide a voltage output which is proportional to the frequency of the input and not the amplitude. The output of discriminator 41 may contain a long time constant detector which is capable of averaging the discriminator output, which when existing will be in pulses synchronous with those of the received echo.

If the target lies exactly on the axis of directivity of each antenna, there will be no voltage output from either discriminator. Should the target lie to the left of the axis of directivity of azimuth antenna 10, a positive voltage for instance, will appear at azimuth discriminator output 41, while a negative voltage will appear there if the target lies to the right of this axis. Similar voltages will appear in the output of elevation discriminator 42, if the target is above or below the axis of directivity of elevation antenna 11. Servo-mechanism 44 and 45 are connected to the output of discriminators 41 and 42, respectively. The antennas are mechanically connected to rotate together, and the combined antennas are free to rotate in the angular directions which they scan. The servo-mechanisms are so connected as to rotate the two antennas together to reduce the discriminator output to zero. This will result in each antenna automatically maintaining its axis of directivity trained on the target. If desired, these servo-mechanism or duplicates may be connected to train any other device which is desired to be trained on an object, for example, a gun or a searchlight. Further the output from the discriminators together with that of the summing circuit may be connected to suitable indicating means which are voltage responsive to furnish an indication of the direction or space position of a target.

If the range of the target is changing rapidly, there will be a slight change in the frequency reflected back due to the Doppler principle with a resulting error introduced into the system. In order to compensate for this, a signal proportional to the rate of change of the range may be applied to variable bias circuit 52. This signal may be obtained from range measuring circuit 50 and range rate circuit 51. Range measuring circuit 50 may be any circuit that produces a voltage wave proportional to the range to the target. Although TR box 32 is designed to prevent the major portion of the transmitted signal from being applied to the mixer 32, a signal of sufficient amplitude will pass through mixer 32 and summing circuit 36 to provide a reference signal for range measurement. Range rate circuit 51 may be any circuit that will provide a signal proportional to the first derivative of the signal from range measuring circuit 51. Various resistor-capacitor circuits as well as other types of circuits for accomplishing this result are well known in the electronics art. As stated above, the signal from range rate circuit 51 is applied to bias circuit 52. This bias circuit varies the bias on the azimuth and elevation frequency discriminators from normal, and thereby changes the normal output of the respective discriminators in such a manner that a correction is applied to the servo-mechanisms to once more train the axis of directivity of each antenna on the target. An alternative method of compensating for this Doppler effect would be to control the frequency of the local oscillator by the variation in range rate through end-frequency pick-off circuit 31. When properly connected this will cause the local oscillator frequency to change sufficiently to offset the frequency change that would be otherwise included in the output of the mixer. The path of control is indicated by the dotted line in the drawing.

The system may be made to lock on a single target and thus avoid hunting between targets by providing fixed or variable band pass filters 53 and 54 between the video amplifiers and the limiters. The band pass characteristic may be made to vary in accordance with the position of the antennas by feeding the output of the servo-mechanisms thereto. The filters may be disconnected at will by suitable switching means to by-pass them, but when connected will not operate until a target is picked up and the system locked on that target, and will have their limited band pass characteristic vary with the changes in target direction.

Although I have shown and described only a certain specific embodiment of the invention, I am fully aware of the many modifications thereof possible.

I claim:

1. A means for directing a device on an object, comprising an antenna movable with said device and adapted to radiate a scanning beam, the direction of said beam with respect to said antenna being dependent on its frequency, an oscillator connected to said antenna, a frequency varier connected to said oscillator and adapted to vary the frequency thereof, a local oscillator, an end frequency pick-off circuit tuning said local oscillator to one limit of said antenna oscillator frequency, a first receiver channel comprising a mixer connected to said antenna through a protecting device and to said local oscillator to produce a signal of video frequency from the beam energy reflected by said object, an amplifier for said video signal, a limiter and frequency discriminator for producing a voltage wave of magnitude dependent on the frequency of said video signal, a servo control circuit for moving said antenna in response to the magnitude of said voltage wave in a direction to reduce the magnitude of said voltage wave whereby the axis of directivity of said antenna will remain fixed on said object.

2. The combination of claim 1 wherein the antenna is movable and adapted to scan in azimuth, and a second antenna and a second receiver channel identical with said first receiver channel, said second antenna being movable and adapted to scan in elevation, whereby the device may be directed in both azimuth and elevation.

3. The combination of claim 1, wherein a summing and range rate circuit are connected to the output of the video amplifier to determine the distance of the object, a rate circuit to differentiate said distance with respect to time, and means varying the bias of the frequency discriminator in response to the magnitude of the derivative and thereby correct the input to the servo control circuit for the frequency change due to movement of the object.

4. The combination of claim 1, wherein a summing and range measuring circuit are connected to the output of the video amplifier to determine the distance of the object, a range rate circuit to differentiate said distance with respect to time, and means varying the frequency of the local oscillator in response to the magnitude of the derivative and thereby correct the input to the video amplifier for the frequency change due to movement of the object.

5. A means for directing a device on an object, comprising an antenna movable with said device and adapted to radiate a scanning beam, an oscillator connected to said antenna supplying the energy for said beam, a frequency varier connected to said oscillator and adapted to vary the frequency thereof, the frequency of said oscillator bearing a predetermined relationship to the position of said beam, means for generating a signal at one limit of said oscillator frequency, means connected to said antenna responsive to said signal generating means and beam energy reflected by said object for producing a signal of video frequency, means for producing a voltage wave of magnitude dependent on the frequency of said video signal, and a servo control circuit for moving said antenna in response to the magnitude of said voltage wave in a direction to reduce the magnitude of said voltage wave.

6. A means for directing a device on an object comprising a high frequency oscillator, means for varying the frequency of said oscillator in a predetermined manner, means coupled to said oscillator for radiating the signal from said oscillator in a scanning beam, the position of said beam with respect to a preselected reference bearing a predetermined relationship to the frequency of said oscillator, a local oscillator, means adapted to maintain a fixed frequency relationship between the output of said local oscillator and one frequency limit of said high frequency oscillator, means responsive to beam energy reflected by said object and said signal from said local oscillator providing a signal of video frequency, means for producing a voltage wave of magnitude dependent on the frequency of said video signal, and a servo control circuit responsive to said voltage wave for directing said energy radiating means at said object.

7. A tracking system for directing a movable device on an object comprising in combination first and second antennas, said antennas being differently polarized and having directional beams which vary in azimuth and in elevation respectively in response to the frequency of signals coupled thereto, means for periodically coupling to said antennas a signal having a frequency that cyclically varies about a predetermined value, whereby said beams are caused to traverse similar azimuth and elevation sectors, means for maintaining said antennas in a relatively fixed spatial relationship such that said sectors are symmetrically disposed about a common axis and receiving means associated with said antennas and responsive to echo signals reflected from an object within either said azimuth or said elevation sector for adjusting the position of said antennas as a unit whereby said common axis is directed at said object.

8. In combination, first and second antennas, said antennas being horizontally and vertically polarized respectively and having radiation patterns, the directivity of which changes in azimuth and in elevation respectively in response to variation in the frequency of signals coupled thereto, means for periodically energizing said antennas with a signal having a frequency that cyclically varies about a predetermined value whereby said radiation patterns are caused to scan similar spatial sectors, means for orientating said antennas such that said sectors are symmetrically disposed about a common axis, receiving means associated with said antennas and responsive to echo signals reflected from an object within either sector for positioning said antennas as a unit whereby said common axis is directed at said object.

9. In an object locating system, the combination of first and second directional antennas, said antennas being differently polarized and having directional beams which change in azimuth and elevation respectively in response to variations in the frequency of the signals fed thereto, means for periodically energizing said antennas with a signal having a frequency that cyclically varies about a predetermined value whereby said directional beams are caused to scan equal spatial sectors in azimuth and in elevation, means for orientating said antennas such that said directional beams are directed to a common point when the signal coupled to said antennas has a frequency corresponding to said predetermined value and receiving means connected to said antennas and responsive to echo signals arriving at said antennas from an object within either sector for adjusting the position of said antennas as a unit whereby said common point coincides with the the location of said object.

10. In an object locating system the combination of first and second directional antennas, said antennas being horizontally and vertically polarized respectively and having directional beam characteristics which change in azimuth and in elevation respectively in response to variations in the frequency of the signals coupled thereto, means for coupling a signal having a cyclically varying frequency to said antennas whereby said directional beams are caused to repeatedly oscillate through similar spatial sectors, means for maintaining said antennas in a spaced relationship such that said beams intersect in a crossover position in each cycle of oscillation and receiving means coupled to said antennas and responsive to echo signals reflected from an object within either sector for adjusting simultaneously the position of said antennas as a unit whereby said fixed spatial relationship is maintained and whereby said cross-over position corresponds to the location of said object.

11. In combination, first and second directional antennas, said antennas being polarized in different directions and having directional beams which rotate in azimuth and in elevation respectively in response to variations in the frequency of the signal coupled thereto, means for periodically energizing said antennas with a signal having a frequency that cyclically varies about a predetermined value whereby said beams are caused to scan equal spatial sectors, means for maintaining a predetermined spatial relationship between the radiating elements of said antennas whereby said sectors are symmetrically disposed about a common axis, a receiver connected to each antenna and responsive to echo signals reflected from an object within the sector scanned by its associated antenna for producing an error signal indicative of the direction and magnitude of the displacement of said common axis from said object and means responsive to said error signal for adjusting the position of said antennas as a unit whereby said predetermined spatial relationship is maintained and whereby said common axis is directed at said object.

12. In combination, first and second directional antennas, said antennas being polarized in different directions and having directional beams which change in azimuth and in elevation, respectively, in response to variations in the frequency of the signals coupled thereto, means for periodically energizing said antennas with a signal having a frequency that cyclically varies about a predetermined value whereby said beams are caused to scan equal spatial sectors in azimuth and in elevation, means for maintaining a predetermined spatial relationship between said antennas whereby said beams are in substantial coincidence when a signal having a frequency corresponding to said predetermined value is fed thereto, a receiver connected to each antenna, each receiver including a frequency discriminating circuit tuned to said predetermined value for producing an error signal having a magnitude and direction depending upon the frequency of echo signals reflected from an object within either spatial sector and means responsive to said error signals for adjusting the position of said antennas whereby said error signals are reduced in magnitude and whereby said position of beam coincidence is made to correspond to the location of said object.

13. In combination, first and second directional antennas, said first antenna being polarized in a predetermined direction and having a directional beam which changes in azimuth in response to variations in the frequency of the signals coupled thereto, said second directional antenna being polarized in a different direction and having a directional beam which changes in elevation in response to variation in the frequency of the signals coupled thereto, means for periodically energizing said antennas with a signal having a frequency that cyclically varies about a predetermined value whereby said beams are caused to scan equal spatial sectors in azimuth and in elevation respectively, means for maintaining a predetermined spatial relationship between said antennas whereby their beams are in substantial alignment when a signal corresponding to said predetermined value is fed thereto, a first receiver coupled to said first antenna and being responsive to echo signals reflected from an object within said azimuth sector, a second receiver coupled to said second antenna and being responsive to echo signals reflected from an object within said elevation sector, said receivers containing frequency discriminating circuits for producing error signals having amplitudes indicative of the frequency of the echo signals arriving at said antennas and means responsive to said error signals for adjusting the position of said antennas whereby said error signals are reduced in magnitude and whereby said position of beam alignment corresponds to the location of an object within either sector.

14. In combination, first and second directional antennas, said antennas being polarized in different directions and having directional beams which change in azimuth and in elevation respectively in response to variations in the frequency of the signals coupled thereto, means for periodically energizing said antennas with a signal having a frequency that cyclically varies about a predetermined value whereby said beams are caused to scan equal azimuth and elevation sectors, means for maintaining a fixed spatial relationship between said antennas whereby said beams are directed toward a common point when the signal coupled thereto corresponds to said predetermined value, a receiver connected to each antenna, each receiver including a frequency discriminating circuit tuned to said predetermined value for producing an error signal having a magnitude determined by the frequency of echo signals reflected from an object within either sector and a servo control circuit for moving said antennas as a unit in response to the magnitude of said error signals in a direction to reduce the magnitude of said error signals and to have said common point correspond to the location of said object.

15. A tracking system for directing a movable device on an object comprising, in combination, first and second antennas, said antennas being differently polarized and having directional beams which vary in azimuth and elevation respectively in response to the frequency of signals coupled thereto, means for periodically coupling to said antennas a signal having a frequency that cyclically varies about a predetermined value whereby said beams are caused to traverse equal sectors in azimuth and elevation, means for maintaining a predetermined fixed spatial relationship between said antennas such that said beams are in substantial coincidence when a signal having said predetermined value is coupled thereto, receiving means associated with said antennas and responsive to echo signals reflected from an object within either said azimuth or said elevation sector for adjusting the position of said antennas as a unit whereby said position of beam alignment corresponds to the location of said object, said receiving means including means for compensating for variations in the frequency of echo signals arriving at said antennas due to the relative motion of said object and said antennas.

16. In combination, first and second directional antennas, said antennas being polarized in different directions and having directional beams which change in azimuth and in elevation respectively in response to variations in the frequency of the signals coupled thereto, means for periodically energizing said antennas with a signal having a frequency that cyclically varies about a predetermined value whereby said beams are caused to scan equal spatial sectors in azimuth and in elevation, means for maintaining a fixed spatial relationship between said antennas whereby said beams are directed to a common point when the signal coupled thereto corresponds to said predetermined value, receiving means associated with said antennas, said receiving means including frequency discriminating circuits for producing a control signal having a magnitude determined by the frequency of echo signals reflected from an object within either sector, means connected to said antennas for producing a control signal proportional to the rate of change of the range of said object, said control signal regulating said frequency disconnecting circuit to compensate for changes in frequency of any echo signals due to the relative motion of said object and said antennas and means responsive to said error signals for adjusting the position of said antennas as a unit whereby said error signals are reduced in magnitude and whereby said common point is made to coincide with said object.

17. A tracking system for directing a device on an object comprising, first and second antennas, said antennas being polarized in different directions and having directional beams which change in azimuth and in elevation respectively in response to the frequency of signals coupled thereto, an oscillator connected to said antennas, a frequency varier connected to said oscillator and adapted to vary the frequency thereof whereby said beams are caused to traverse equal spatial sectors, means for generating a signal at one limit of said oscillator frequency, means connected to said antennas, responsive to said signal generating means and echo signals reflected from an object within either sector for producing a signal of video frequency, means for generating a voltage wave having a magnitude dependent on the frequency of said video signal and a servo control circuit for moving said antennas as a unit in response to the magnitude of said voltage wave in a direction to minimize the magnitude of said voltage wave.

References Cited in the file of this patent

UNITED STATES PATENTS

| | | |
|---|---|---|
| 1,073,624 | Pickerill | Sept. 23, 1913 |
| 2,176,469 | Moueix | Oct. 17, 1939 |
| 2,231,929 | Lyman | Feb. 18, 1941 |
| 2,277,464 | Taylor | Mar. 24, 1942 |
| 2,277,731 | Toth | Mar. 31, 1942 |
| 2,337,214 | Tunick | Dec. 21, 1943 |
| 2,372,620 | Williams | Mar. 27, 1945 |
| 2,399,426 | Bradley | Apr. 30, 1946 |
| 2,402,410 | Kear | June 18, 1946 |
| 2,403,728 | Loughren | July 9, 1946 |
| 2,412,612 | Godet | Dec. 17, 1946 |
| 2,433,804 | Wolff | Dec. 30, 1947 |
| 2,480,208 | Alvarez | Aug. 30, 1949 |
| 2,555,101 | Alvarez et al. | May 29, 1951 |
| 2,585,855 | Sherwin et al. | Feb. 12, 1952 |